United States Patent [19]

Hammel et al.

[11] 4,282,023
[45] Aug. 4, 1981

[54] GLASS MELTING ENHANCEMENT BY TOROIDAL BATCH SHAPING

[75] Inventors: Joseph J. Hammel, O'Hara Township, Allegheny County, Pa.; John D. Mackenzie, Los Angeles, Calif.

[73] Assignee: PPG Industries, Inc., Pittsburgh, Pa.

[21] Appl. No.: 174,469

[22] Filed: Aug. 1, 1980

[51] Int. Cl.³ .............................................. C03B 5/00
[52] U.S. Cl. ....................................... 65/134; 65/135; 65/136
[58] Field of Search .................. 65/134, 135, 136, 335

[56] References Cited

U.S. PATENT DOCUMENTS

| | | | |
|---|---|---|---|
| 1,916,262 | 7/1933 | Good . | |
| 2,214,191 | 9/1940 | Batchell et al. | 49/63 |
| 2,327,887 | 8/1943 | Halbach et al. | 49/54 |
| 2,533,826 | 12/1950 | Lyle | 49/54 |
| 2,578,110 | 12/1951 | Tooley | 49/77 |
| 2,749,666 | 6/1956 | Baque | 49/77 |
| 2,829,784 | 4/1958 | Henry et al. | 214/18 |
| 3,127,033 | 3/1964 | Lyle | 214/18 |
| 3,193,119 | 7/1965 | Blaine | 214/23 |
| 3,233,022 | 2/1966 | Henry et al. | 264/123 |
| 3,637,365 | 1/1972 | Oulton | 65/134 |
| 3,780,889 | 12/1973 | Frazier et al. | 214/33 |
| 3,896,201 | 7/1975 | Mabru | 264/118 |
| 3,994,710 | 11/1976 | Schwenninger | 65/135 |
| 4,004,903 | 1/1977 | Daman et al. | 65/135 |
| 4,023,976 | 5/1977 | Bauer et al. | 106/52 |
| 4,030,905 | 6/1977 | Hawkins | 65/135 |

Primary Examiner—Arthur D. Kellogg
Attorney, Agent, or Firm—Dennis G. Millman

[57] ABSTRACT

The rate of melting glass batch to a liquid state is improved by providing sloped surfaces on the batch to enhance run-off of liquid. The slopes are provided by feeding batch as toroidally shaped aggregates.

8 Claims, 5 Drawing Figures

GLASS MELTING ENHANCEMENT BY TOROIDAL BATCH SHAPING

BACKGROUND OF THE INVENTION

This invention relates to improvements in the rate of melting glass in a tank-type melting furnace whereby the output of a particular furnace may be increased at a given energy consumption, or, conversely, the energy consumption may be reduced for a given throughput. More particularly, the invention deals with improvements in the manner in which raw glass batch materials are fed to a glass melting furnace so as to enhance the rate the raw ingredients are brought to a liquid state.

In a typical glass melting furnace of the regenerative or recuperative type, a body of molten glass is maintained in the furnace and raw glass batch materials are fed through an inlet at one end of the furnace onto the surface of the pool of molten glass. There, the batch materials usually form an unmelted layer on the surface of the molten glass pool which may extend a considerable distance into the furnace until it becomes melted into the pool of molten glass. At the opposite end of the furnace, melted and reacted glass is withdrawn from the pool of molten glass through an outlet opening.

It has been recognized that the floating layer or blanket of unmelted batch ingredients acts as a thermal insulator which limits the rate at which the temperature of the batch is raised sufficiently to enter a liquid state. Therefore, liquefaction of glass batch usually is limited to a relatively thin layer at the surface of the batch blanket. In order to overcome this problem, attempts have been made in the past to increase the surface area of the batch blanket exposed to the flames in the furnace. For example, U.S. Pat. No. 4,030,905 shows an arrangement for plowing furrows transversely across a batch blanket. Such an arrangement may produce an increase in batch surface area and some slight improvement in run-off of melted batch, but possesses certain drawbacks. Plowing the furrows causes batch to be piled up more deeply on either side of each furrow, thereby further insulating the underlying batch from the overhead sources of heat. Furthermore, any enhancement in run-off by plowing is limited because the furrows do not extend to the underlying molten glass and because some of the loose batch material tends to fall back into the furrow behind the plow.

Another approach to breaking up a batch blanket is disclosed in U.S. Pat. No. 3,994,710 wherein an inverted T shaped member is employed to chop the batch blanket into pieces. Such an arrangement appears most suitable for a location relatively far into the furnace where melting of the batch blanket has already progressed to an advanced stage. It would be desirable to improve run-off as early as possible in the melting process. Additionally, by being located within the main body of the melting furnace, the T bar of the patent requires cooling which detracts from any net thermal gains. Also, operating on the batch blanket within the main body of the furnace carries with it the risk of increased carry-over of materials which can have an adverse effect on the walls and regenerator or recuperator system of the furnace. However, carrying out such a chopping operation on an upstream portion of the batch blanket would not appear to be advantageous since the buoyant batch material would be pressed into the molten glass temporarily and then rise again.

Another prior art approach has been to bring the batch ingredients into more intimate contact with the molten glass such as in U.S. Pat. Nos. 2,533,826 and 2,749,666. The object of this approach is to take advantage of conductive heat from the molten glass, but it has now been found that the major source of heat (typically about seventy percent) for melting the batch is the overhead radiant heat from the combustion flames in the furnace. Therefore, covering the batch with molten glass can be disadvantageous in that it reduces the amount of radiant heat received by the batch. It would be desirable to increase rather than decrease the impingement of radiant energy on the batch materials.

Other attempts have been made to improve batch melting by reducing the thickness of the batch blanket such as in U.S. Pat. Nos. 2,327,887; 3,193,119; and 4,004,903. While reducing batch blanket thickness may generally be desirable, the approach in each of these patents has the drawback of reducing surface area exposed to overhead flames and inhibiting run-off of melted batch. Furthermore, in many commercial glass melting operations, a primary objective is to maximize throughput of a given furnace. In such a case, the batch blanket would already cover a maximum area and any reduction in batch blanket thickness would undesirably reduce the throughput of the furnace. The last mentioned patent overcomes this dilemma somewhat by compacting the batch blanket, but, nevertheless, a flat upper surface is the result.

It is also known to produce a plurality of discrete batch piles by employing a plurality of small batch feeders such as in U.S. Pat. No. 3,127,033. Such an approach appears to be quite limited as to throughput because of the small size of the inlets through which batch is fed.

Two types of batch feeders are in widespread commercial use in the glass industry. The first being the reciprocating tray type as shown in U.S. Pat. Nos. 1,916,262 and 3,780,889 and the second being the rotary type as shown in U.S. Pat. No. 2,829,784. The reciprocating tray type feeder inherently tends to form a series of ridges extending laterally across the batch blanket. However, these ridges are not as steep as would be desired for the sake of enhancing run-off nor do the furrows between the ridges provide a sufficiently free path for run-off. After melting of the batch blanket has progressed substantially, the ridges typically become separated into floating masses known as "logs." However, break-up of the batch blanket does not occur as early as would be desired. The rotary type feeder produces a nearly level batch blanket with only a shallow treadmark on the surface produced by the rotary feeder blades. Hence, the rotary type feeder is particularly characterized by poor run-off.

It appears that the prior art has not fully appreciated nor used the advantages attendant to enhancing run-off of melted material from a batch blanket.

SUMMARY OF THE INVENTION

It has now been found that a major rate determining step of the glass melting process is the ablation of the batch layer, i.e., the run-off of a thin melted layer to expose underlying unmelted batch. Although surface area available for heat transfer to the batch is an important parameter for determining the rate of melting, it has now been discovered, quite surprisingly, that the area available for run-off is even more important. Thus, the present invention is directed to improving the run-off of liquid material from the batch layer so as to improve the overall melting rate. This is accomplished by increasing the amount of sloped area on the upper surface of the batch blanket. Moreover, this contouring of the batch blanket is achieved in the preferred embodiments of the present invention without increasing the thickness of portions of the batch layer and without requiring a reduction in the mass throughput of a glass melting furnace. This is accomplished by providing compacted, sloped surfaces on the batch layer. The most beneficial ablation enhancing affects have been found when the batch blanket is provided not only with a large proportion of sloped run-off areas, but also with a well distributed number of run-off openings extending substantially through the thickness of the batch blanket and into communication with the underlying molten glass. These run-off openings prevent a slow-down of the ablation affect due to the areas between the run-off slopes becoming filled with the melted liquid.

Ablation enhancement per se is the subject matter of co-pending U.S. patent application Ser. No. 155,802, filed on June 2, 1980, by Joseph J. Hammel and entitled "Method of Improving Glass Melting by Ablation Enhancement." The present invention relates particularly to ablation enhancement by imparting toroidal shapes to the batch materials being fed to a glass melting furnace. Since the primary purpose for these toroids of batch is to provide sloping surfaces for run-off rather than surface area, the toroids should be in the form of aggregates sufficiently large to maintain their structural integrity for an appreciable time within the furnace. Therefore, the toroidal aggregates are preferably considerably larger than the units of agglomerated batch previously employed in the prior art (e.g., pellets and briquettes). On the other hand, the shaped aggregate should not be so large as to result in unmelted chunks traveling downstream into the furnace beyond the usual batch melting zone. Therefore, it would be preferred that the shaped aggregates have a height no greater than the usual thickness of a batch blanket.

Conventional glass batch formulas, when slightly wetted with water or caustic soda solutions, can readily be molded to toroidal shapes having sufficient structural integrity. The wetted batch may be tamped slightly into a mold, or conventional briquetting or tabletting processes on an enlarged scale may be employed. In any case, the batch in the shaped aggregate will be compacted relative to a loosely fed batch blanket. The shaped aggregates may be fed into the melting furnace with a distribution that provides substantially an equivalent mass density of batch in the melting zone to that conventionally provided by the batch blanket. At the same time, interstices between the shaped aggregates provide run-off openings to the underlying body of molten glass.

THE DRAWINGS

DETAILED DESCRIPTION

Figure 1:
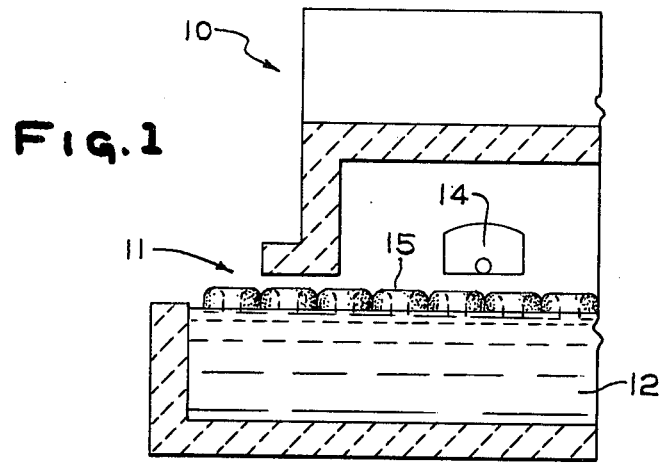
FIG. 1 is a schematic, cross-sectional side view of the inlet end of a continuous, flat glass melting furnace, showing a batch layer as an array of toroids in accordance with the present invention.

The insulating affect of glass batch has been demonstrated by melting a hemisphere of batch having a six inch (15.24 centimeter) radius in which thermocouples were implanted at various distances from the surface. Melting the hemisphere in a furnace at 2800° F. (1540° C.) produced a surface layer of foam, beneath which active melting appeared to take place in a 0.15 inch (3.8 millimeter) thick layer at the surface of the hemisphere. The temperature at the outside of this thin melting layer was 2050° F. (1120° C.) and on the inner side was 1500° F. (825° C.). An additional inch (2.54 centimeters) below the melting layer, the batch temperature was observed to be approximately 100° F. (38° C.), which was only slightly above room temperature. Dissection of partly melted hemispheres shows that a major portion of the batch in the interior remains unaffected, even though melting has taken place at the surface.

The following experiment was conducted to observe the influence of shape on the melting rate of batch. Glass batch of a standard commercial formulation was molded into five shapes: slab, cone, hemisphere, scalloped slab, and toroid. So that each of the shapes would represent a modification of a given area of a batch blanket, each of the shapes was proportioned so as to yield essentially the same base area and volume (and therefore mass) based on the base area and volume of a six inch (15.24 centimeter) radius hemisphere. Surface area varied from one shape to another. The precise dimensions are set forth in Table 1. The shapes were molded by tamping the batch, which was wetted with about 7 to 8 weight percent water, into a mold so as to compact the batch to a density of about 90 pounds per cubic foot (1.43 kg/liter) compared to a loose batch density of about 70 to 75 pounds per cubic foot (1.11 to 1.19 kg/liter). The slab at its base measuring 10.6 by 10.6 inches (27.0 by 27.0 centimeters) and 4 inches (10.16 cm) in height. The cone had a base diameter of 12 inches (30.5 cm) and a height of 12 inches (30.5 cm). The hemisphere had a radius of six inches (15.24 cm). The scalloped slab had a base of 15.45 by 7.33 inches (39.2 by 18.6 cm) and a height of 2 inches (5.08 cm) above which extended three continguous, axially bisected cylinders, each having a radius of 2.57 inches (6.53 cm) and a length of 7.33 inches (18.6 cm). The toroid had an outer base diameter of 12.2 inches (31.0 cm) and an inner opening 1.9 inches (4.8 cm) in diameter at the base. The upper portion of the toroid was hemispherically rounded with a radius of 2.57 inches (6.53 cm) and rested on a base portion 2 inches (5.08) in height which was rectangular in cross-section like those shown in FIG. 2. Each of these shapes was placed into a furnace at 2800° F. (1540° C.) and the time required to render the batch entirely to liquid was measured. Liquefied batch running off from the shapes was permitted to drain from the vicinity of the shape. The results are shown in Table I in the order of increasing melting rates.

TABLE I

| Shape | Base Area in² (cm²) | Volume in³ (liters) | Surface Area in² (cm²) | Surface/Volume Ratio in⁻¹ (cm⁻¹) | Melting Time min. |
|---|---|---|---|---|---|
| Slab | 112.9 (728.2) | 451.6 (7.40) | 282.9 (1825) | 0.62 (0.25) | 37.3 |
| Cone | 113.1 (729.5) | 452.4 (7.42) | 252.9 (1631) | 0.56 (0.22) | 36.3 |
| Hemisphere | 113.1 (729.5) | 452.4 (7.42) | 226.2 (1459) | 0.5 (0.20) | 35.8 |
| Scalloped slab | 113.25 (730.5) | 454.6 (7.46) | 330.9 (2134) | 0.73 (0.29) | 34.5 |
| Toroid | 116.9 (754.0) | 457.9 (7.51) | 267.4 (1725) | 0.59 (0.23) | 27.3 |

It can be seen that, contrary to what might be expected, the melting rate did not correspond to surface area of the shapes. For example, the slab shape, in spite of having the second largest surface area, exhibited the slowest melting time. On the other hand, the toroid, with only the third largest surface area, exhibited a melting time significantly shorter than any of the other shapes. It is believed that these results may be explained in terms of relative run-off areas provided by the shapes, with the superior performance of the toroid apparently being due to the fact that run-off from a toroid shape occurs in two directions: toward the central opening, and down the outer periphery. If a conventional batch blanket most closely resembles the slab shape, it may be concluded that contouring the batch blanket to more closely resemble any of the other shapes, in particular the toroid, would result in improvements in melting rate comparable to those shown in Table I.

The most straightforward adaptation of the present invention to commercial glass melting processes is to form aggregates of glass batch to a toroidal shape at a batch preparation station separate from the melting furnace. The shaping may be carried out simply by pressing the wetted batch into a mold, but for full-scale production, it is preferred that a briquetting type process be used such as those shown in U.S. Pat. Nos. 2,214,191; 2,578,110; 3,233,022; and 4,023,976. Unlike these prior art briquetting methods, wherein the object is to produce a large number of small agglomerates having a cumulative large surface area, the preferred mode of the present invention entails the production of relatively massive aggregates having sloped surfaces which will have a relatively extended life span within a melting furnace. It would be preferred that the aggregates present sloped surfaces at a substantial elevation above the surface of the molten glass in a melting furnace for at least one half of the residence time of the last melted increment of batch. For example, batch is typically reduced to liquid in a large commercial flat glass furnace in a maximum time on the order of about thirty minutes, in which case it would be preferred that the sloped run-off surfaces of the aggregates persist for at least fifteen minutes in such a furnace. Thus, the toroids of the present invention will preferably be considerably larger in size than the briquettes or pellets of glass batch which have been previously proposed. It is preferred that the aggregates of the present invention each have a base area of which the minor dimension is at least 10 centimeters, up to about 25 centimeters. A similar range is preferred for the height of each aggregate. Since the lower portion of each aggregate will be submerged beneath the surface of the molten glass in the furnace, the shape of the lower portion is not critical for the purposes of the present invention and may be flat or irregular, irrespective of the shape of the upper portion of the aggregate.

It has been found that glass batch moistened with water to a moisture content of about five percent to ten percent by weight, preferably seven to eight percent, has sufficient self-adhesion to be molded into toroids having sufficient structural integrity for the purposes of the present invention. Instead of, or in addition to, some or all of the water, other binding aids such as caustic soda solution or sodium silicate solution may be employed. Also, molding may be aided by the use of known organic binding agents. Molding glass batch to a self supporting shape entails compacting at least a surface portion of the shape. Sufficient compaction, expressed as percentage increase of density, is generally in the range of ten percent to forty percent, preferably fifteen percent to thirty percent. In some cases it may be sufficient for the compaction to take place in surface portions only of the agglomerate (e.g., the first one to five centimeters) since a compacted outer shell may contain a non-compacted quantity of batch in the interior of the aggregate.

The data herein regarding compaction and moisture content pertain particularly to the following flat glass batch formula which is also the formula employed in the examples of Table I:

TABLE II

| Ingredient | Parts by Weight |
|---|---|
| Sand | 1,000 |
| Soda Ash | 313.5 |
| Limestone | 84 |
| Dolomite | 242 |
| Salt Cake | 14 |
| Rouge | 0.75 |
| Coal | 0.75 |

The above batch formula is a typical commercial flat glass batch formula, but the principles of the present invention are applicable to the many possible variations in batch formulas, not only for flat glass, but also for fiber glass, container glass, silicate melting, and others with only slight, if any, variations from the specific examples set forth herein. By following the general teachings of the present invention, producing a structurally stable aggregate of any conventional glass batch formula will be well within the ordinary skill of the person in the art.

Figures 2, 3:
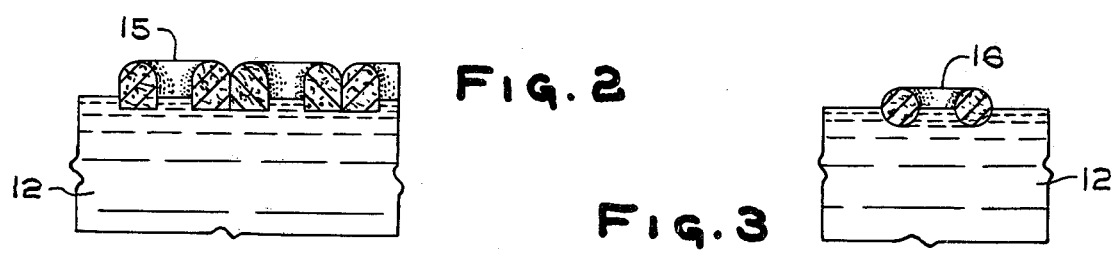
FIG. 2 is an enlarged cross-sectional view of the toroid shaped batch layer of FIG. 1.
FIG. 3 is a cross-sectional view of an alternate form of a toroidal batch aggregate.

The shaped aggregates may be fed to a melting furnace by means of a reciprocating tray type feeder with a plurality of the aggregates side by side so as to form an array of aggregates floating on the pool of molten glass whose appearance would resemble those in FIGS. 1 and 2.

Another embodiment of the invention may entail shaping of the glass batch aggregates at the inlet to the melting furnace itself. This could be effected by means of a reciprocating press type molding apparatus or a continuous rotating mold provided with a plurality of mold concavities about its periphery. Depending upon the compactability of the wetted batch formula, the downward pressure of the rotating mold acting against the buoyant force of the batch may be sufficient to compact the batch and form the aggregates. In other cases, the pressure required for compaction may be produced between a mold and a stationary rigid member between which the batch may be pinched. The rotating mold may also serve as a batch pusher to feed the contoured batch blanket into the main portion of the furnace in the same manner as a rotary type feeder.

FIG. 1 shows an inlet end of a typical continuous flat glass melting furnace 10 having an inlet opening 11 and containing a pool of molten glass 12. Because materials are shown being fed through the inlet opening 11 as a series of molded aggregates in the shape of toroids 15 which form an array that may be several toroids wide and extends into the main portion of the furnace. In FIG. 1 the toroids are depicted as extending beyond burner port 14, which is the first of a series of burner ports (typically 4 to 8 on each side), although the extent of the batch layer into the furnace will vary from one furnace to another.

Figure 5:
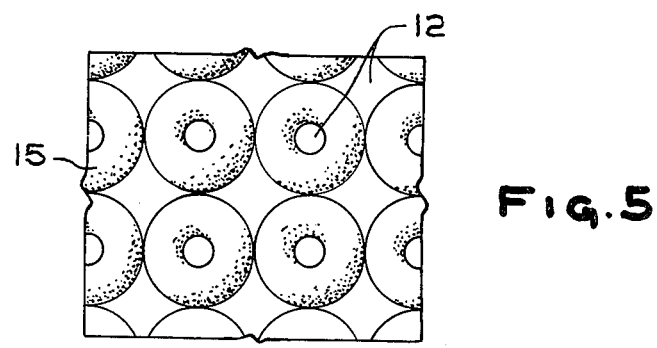
FIG. 5 is a plan view of an array of torroidal batch aggregates as in FIGS. 1 and 2.

An enlarged cross-sectional view of the toroidal aggregates 15 is shown in FIG. 2, where it may be seen that the toroids may have flat bottoms. The more classical "doughnut" shaped toroid such as the molded aggregate 16 in FIG. 3 may also be employed and it should be understood that both types of shapes, as well as other variations of the basic toroid, are intended to be encompassed by the terms "toroid" and "toroidal" as employed herein. It is contemplated that the specific shapes of FIGS. 2 and 3 would be molded at a preliminary station and then deposited onto the pool of glass 12 within the furnace. As depicted in FIG. 5, the toroids would be fed several abreast so that the batch layer is in the form of an array of the toroids which may be advanced incrementally into the furnace by conventional pushing means.

Figure 4:
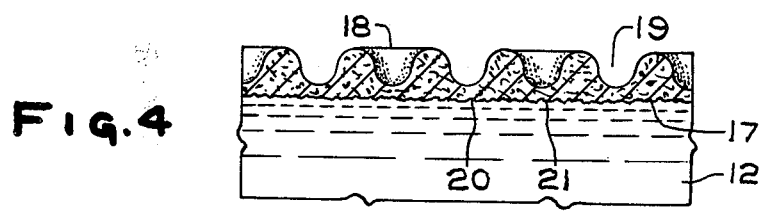
FIG. 4 is yet another alternate form of toroidal shaping of a batch layer contemplated by the present invention.

In another embodiment of the invention, the toroidal shapes may be imparted to a batch layer after the batch layer has been deposited onto the molten glass at the inlet end of the furnace. Mold means may be employed at the inlet periodically to impress a pattern of toroidally shaped mounds and depressions such as that shown in FIG. 4. There, a batch layer 17 floating on a surface of molten glass 12 has had an array of toroid shaped mounds 18 separated by depressions 19 imparted thereto. Initially, discrete toroids may not be formed, but early in the melting process the thin batch portions 20 at the bottom of the depressions 19 as well as the thin portions 21 at the bottom of the central opening of each toroid will melt away, providing a large number of well distributed openings through which run-off from the remainder of the shaped batch layer may pass into the underlying pool of molten glass.

The specific embodiments and examples set forth herein have been disclosed for the sake of illustration and to describe the best modes for practice of the invention, but it should be apparent that other variations and modifications known to those skilled in the art may be applied to the present invention without departing from the spirit and scope of the invention as set forth in the claims.

We claim:

1. In a method for melting glass wherein particulate glass batch materials are fed into a heated enclosure, where the batch floats on the surface of a pool of molten glass therein until the batch becomes liquefied, the improvement comprising feeding the batch into the enclosure in the form of toroidally shaped aggregates whereby run-off of liquified batch from the unmelted mass of batch into the pool of molten glass is enhanced.

2. The method of claim 1 wherein the toroidally shaped aggregates have an outer diameter of at least ten centimeters.

3. The method of claim 1 wherein the toroidally shaped aggregates are formed prior to feeding into the furnace.

4. The method of claim 1 wherein the toroidally shaped aggregates are formed after the batch materials are deposited onto the pool of molten glass.

5. The method of claim 1 wherein at least surface portions of said toroidally shaped aggregates are compacted.

6. The method of claim 5 wherein the batch is wetted with about 5 to 10 percent by weight water prior to being shaped.

7. The method of claim 1 wherein the toroidal shapes are initially imparted to a unitary batch layer which subsequently separates by melting into discrete toroidally shaped aggregates of batch.

8. The method of claim 1 wherein a plurality of the toroidal aggregates are fed into the furnace side-by-side so as to establish an array of the toroidal aggregates extending a substantial distance into the melting zone of the furnace.

* * * * *